(12) United States Patent
Bogard

(10) Patent No.: US 6,227,602 B1
(45) Date of Patent: May 8, 2001

(54) PICK-UP TRUCK LIGHTWEIGHT CARGO COVER

(76) Inventor: Donald E. Bogard, 22204 Dolphin Ct., Dearborn Heights, MI (US) 48127

( * ) Notice: Subject to any disclaimer, the term of this patent is extended or adjusted under 35 U.S.C. 154(b) by 0 days.

(21) Appl. No.: 09/379,278

(22) Filed: Aug. 23, 1999

(51) Int. Cl.⁷ ...................................................... B60P 7/02
(52) U.S. Cl. .............................. 296/100.06; 296/100.09; 296/100.07
(58) Field of Search ........................ 296/100.02, 100.06, 296/100.07, 100.09, 191; 292/DIG. 42, DIG. 43, 338

(56) References Cited

U.S. PATENT DOCUMENTS

| 2,909,387 | * | 10/1959 | Burtzloff | 296/100.07 |
|---|---|---|---|---|
| 3,489,456 | * | 1/1970 | Klanke | 296/100.07 |
| 3,796,168 | * | 3/1974 | Zeller | 296/100.02 |
| 3,829,151 | * | 8/1974 | Fellenstein | 296/100.06 |
| 4,313,636 | * | 2/1982 | Deeds | 296/100.09 |
| 4,418,954 | * | 12/1983 | Buckley | 296/100.09 |
| 4,522,440 | * | 6/1985 | Gostomski | 296/100.07 |
| 4,615,557 | * | 10/1986 | Robinson | 296/100.07 |
| 4,747,441 | * | 5/1988 | Apolzer et al. | 296/100.09 |
| 4,762,360 | * | 8/1988 | Hubber | 296/100.07 |
| 4,824,162 | * | 4/1989 | Geisler et al. | 296/100.09 |
| 4,861,092 | * | 8/1989 | Bogard | 296/100.09 |
| 4,946,217 | * | 8/1990 | Steffens et al. | 296/100.09 |
| 5,087,093 | * | 2/1992 | Repetti | 296/100.09 |
| 5,605,371 | * | 2/1997 | Borchelt et al. | 296/188 |
| 5,653,491 | * | 8/1997 | Steffens et al. | 296/100.09 |
| 5,685,593 | * | 11/1997 | O'Connor | 296/100.03 |
| 5,857,729 | * | 1/1999 | Bogard | 296/100.09 |
| 6,059,350 | * | 5/2000 | Kooiker | 296/100.09 |
| 6,076,881 | * | 6/2000 | Tucker | 296/100.07 |
| 6,082,806 | * | 7/2000 | Bogard | 296/100.06 |

* cited by examiner

Primary Examiner—Joseph D. Pape
Assistant Examiner—Kiran B. Patel
(74) Attorney, Agent, or Firm—Alex Rhodes

(57) ABSTRACT

A cargo cover for covering an open cargo box of a pick-up truck comprising a pair of similar pivotally connected panels extending from a forward portion of the cargo box to a rearward portion of the cargo box. Each of said panels is formed from a pair of thin spaced apart metal sheets joined together by folding an outer portion of one of the sheets over an outer portion of the other of the sheets. The panels are pivotally connected with a linear hinge which substantially extends across the full width of the cover. Several embodiments for locking the panels to the pick-up truck are disclosed. In one embodiment, the cover is locked by engaging thin transverse rods with strikers which are attached to opposite sides of the pick-up truck. In a second embodiment, a "pull" type solenoid mounted on a panel engages a plunger with a striker mounted on the pick-up truck. In a third embodiment, a single key lock unlocks the front and rear panels.

22 Claims, 12 Drawing Sheets

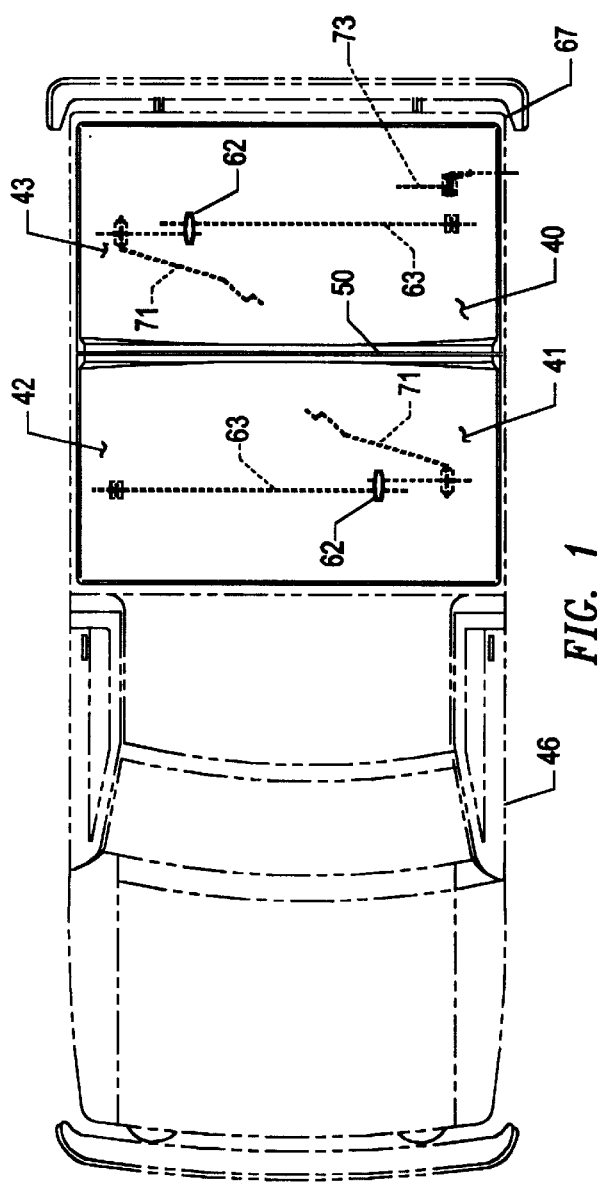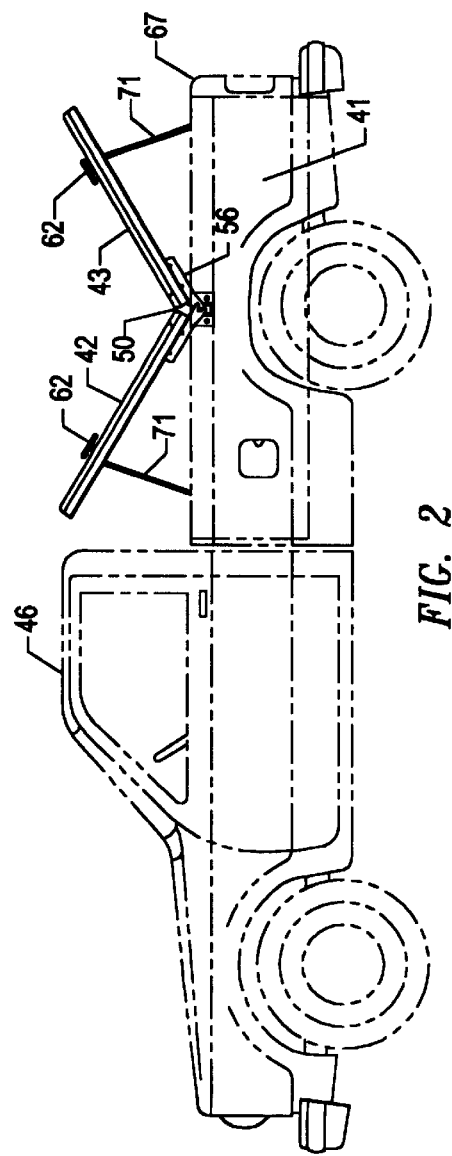

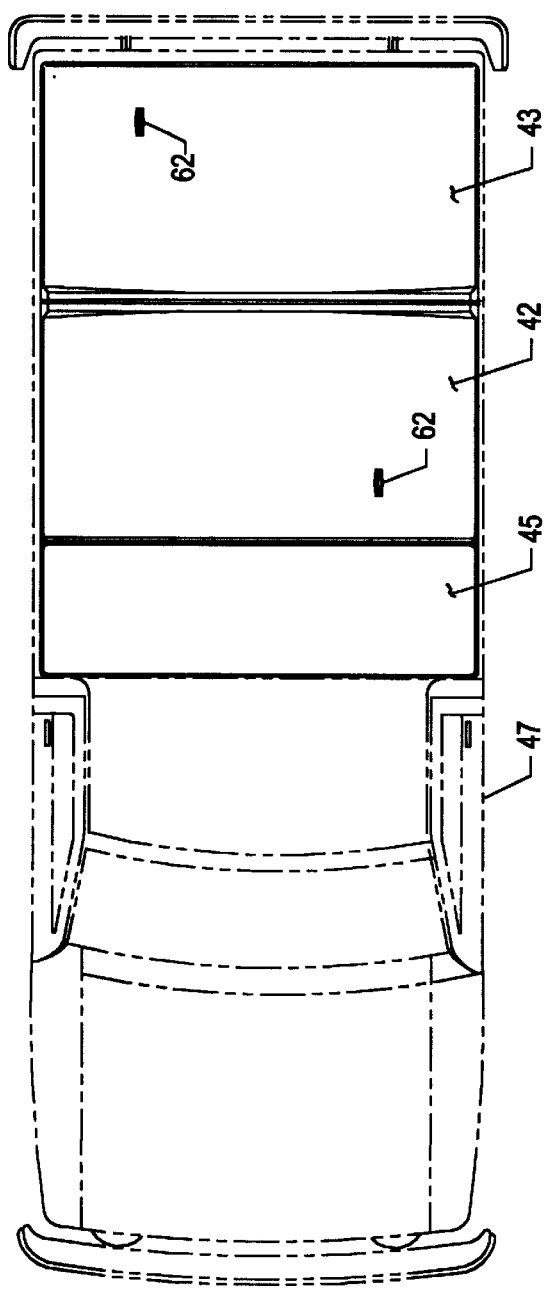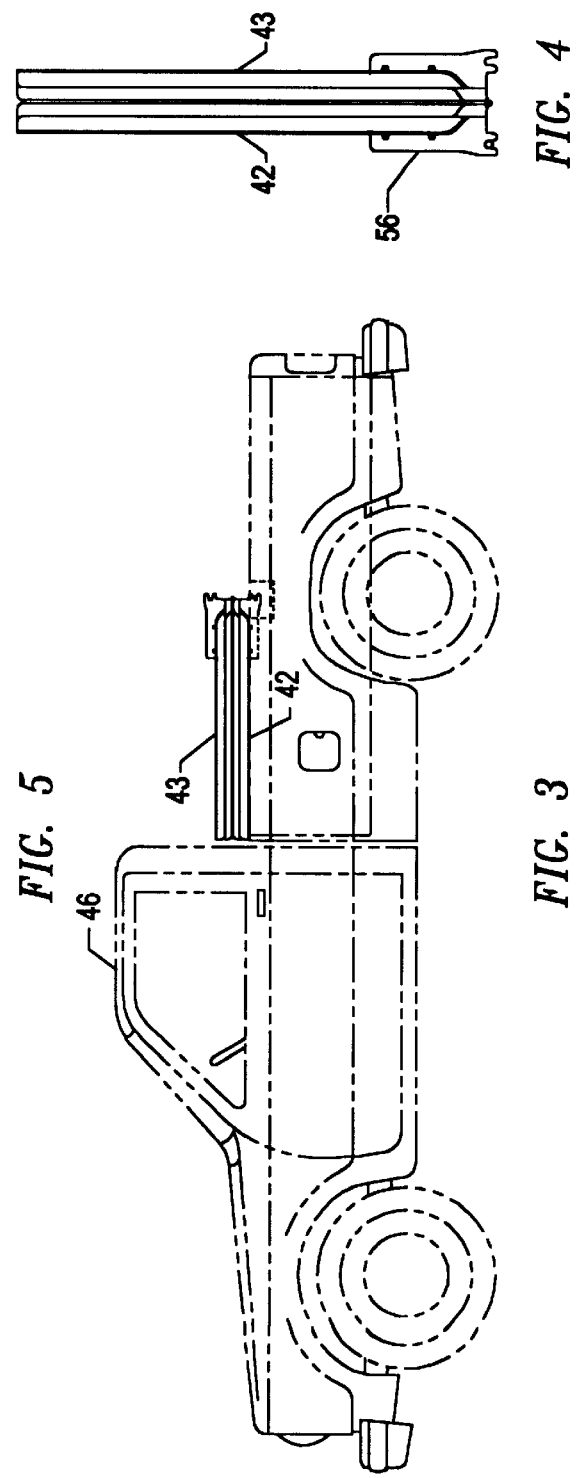

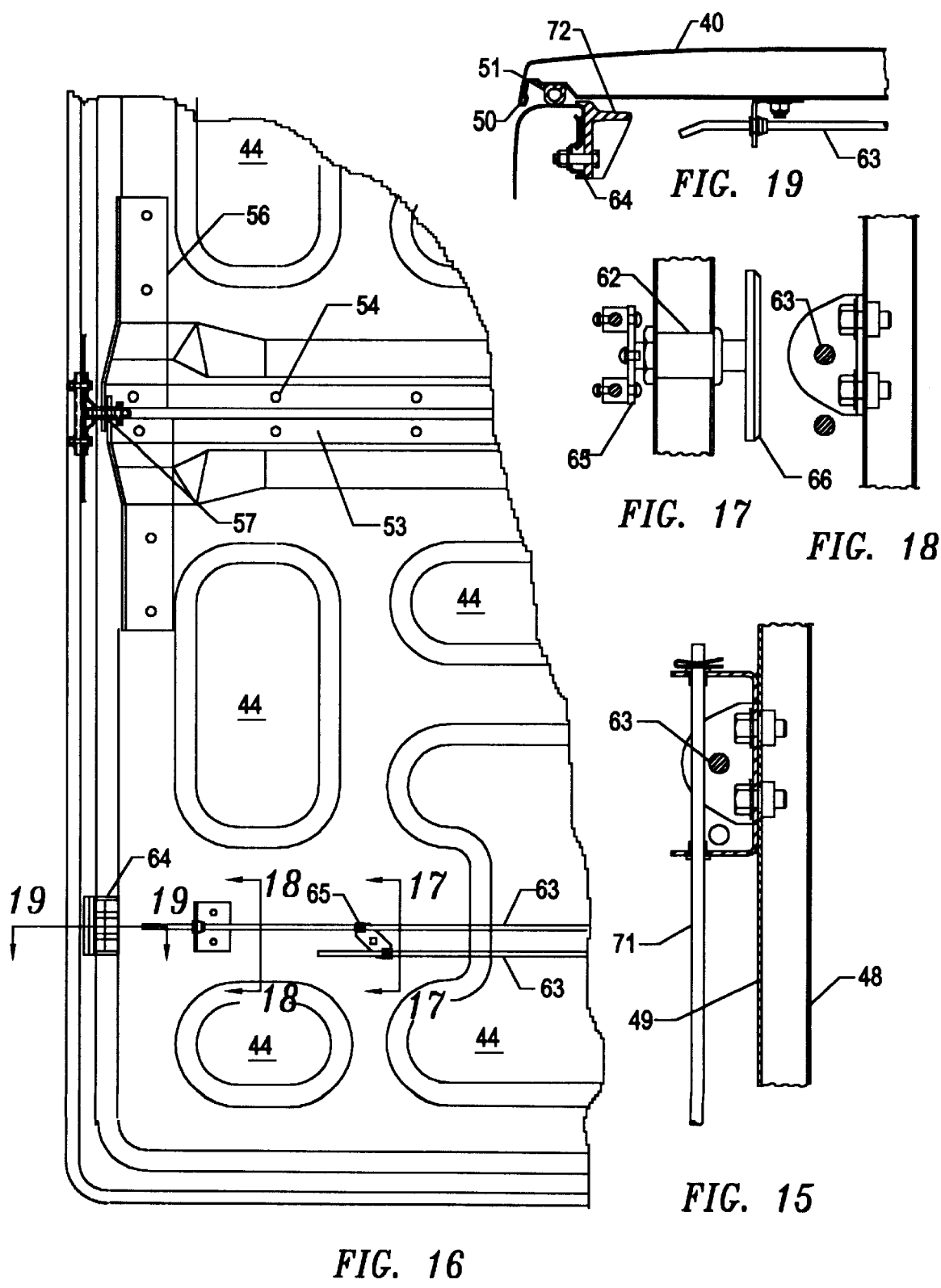

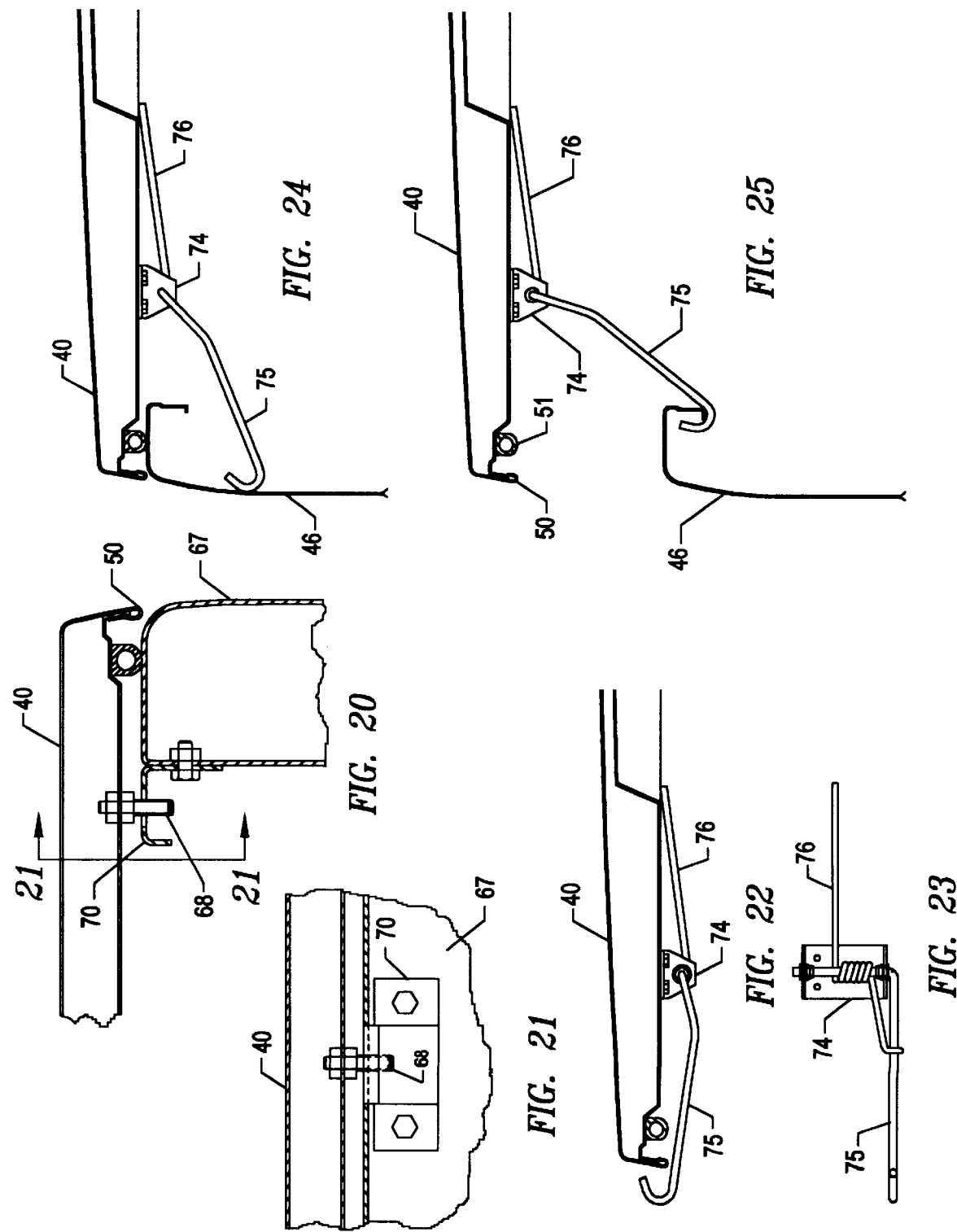

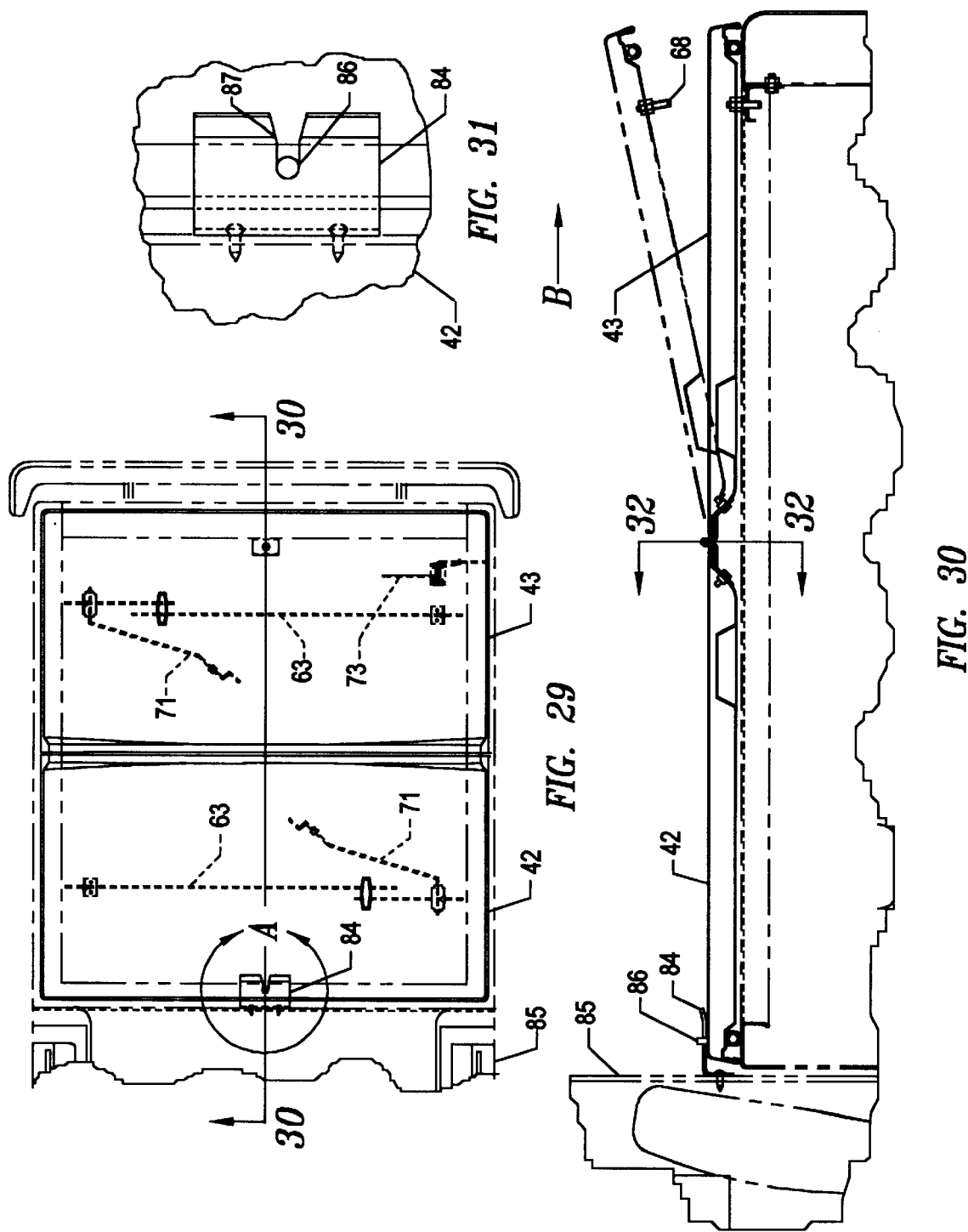

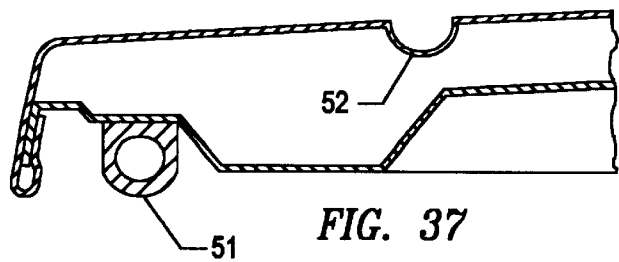
FIG. 37
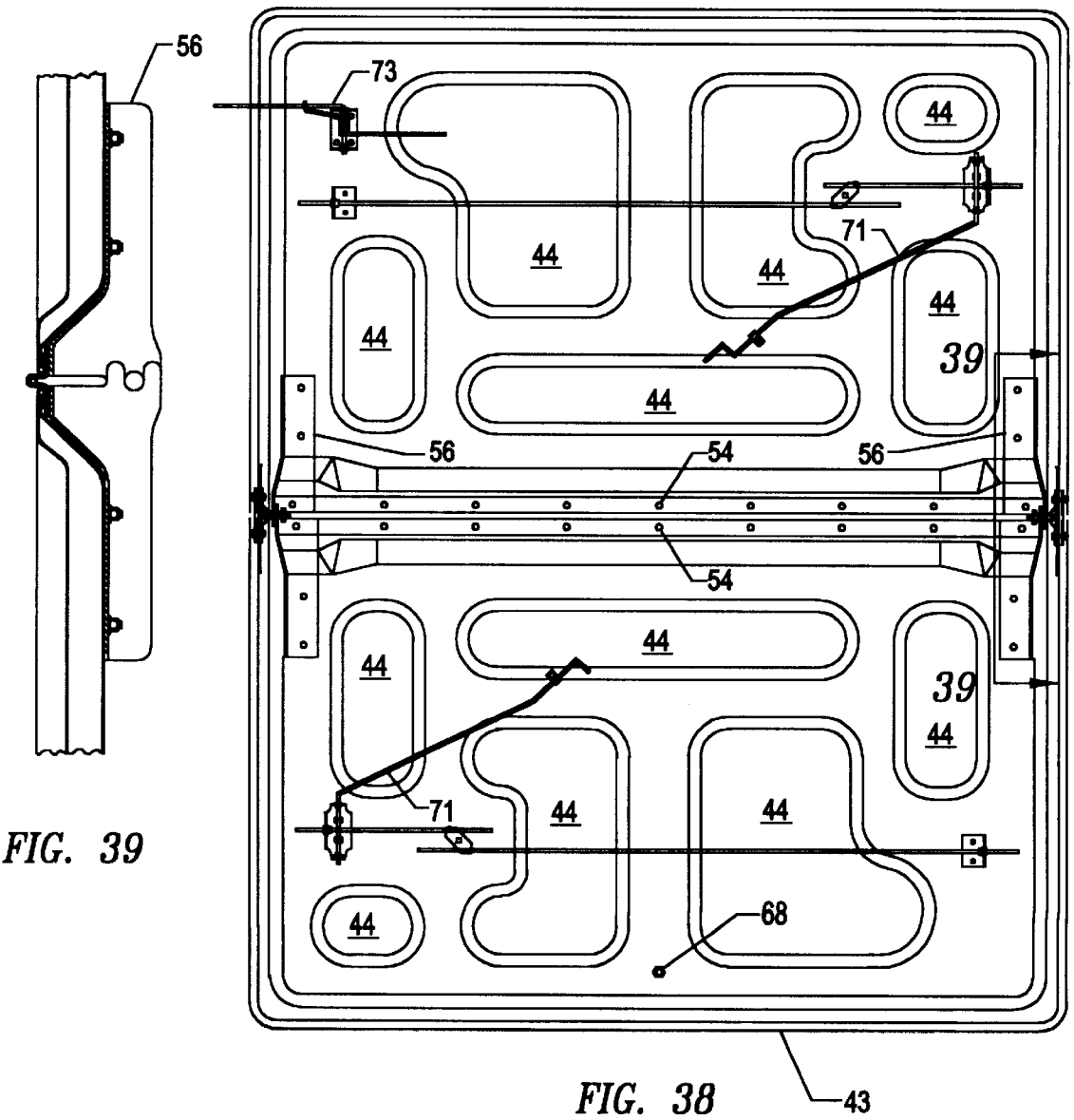
FIG. 39
FIG. 38

PICK-UP TRUCK LIGHTWEIGHT CARGO COVER

FIELD OF THE INVENTION

This invention relates to truck covers and more particularly to a light weight rigid cargo cover.

BACKGROUND OF THE INVENTION

Of the two types of pick-up truck covers which are available, namely, soft and rigid covers, soft covers are relatively light in weight and low in cost. Soft covers are easily damaged, have low durability and provide minimum theft protection. Rigid cargo covers are durable and provide theft protection but are heavy and high in cost.

There is an urgent need to reduce the weight of pick-up truck accessories because of concerns regarding decreases in America's fuel consumption caused by increased sales of pick-up trucks. Cargo cover weight also reduces pick-up truck performance and increases the efforts in raising, lowering, installing and removing a cover.

In view of the foregoing, a rigid lightweight pick-up truck cargo cover would satisfy an urgent need and provide other important benefits.

SUMMARY OF THE INVENTION

A principal object of the invention is to reduce the weight of rigid cargo covers. Another object is to reduce the cost of rigid cargo covers. Another object is to provide a rigid cargo cover having the appearance of an integral part of a vehicle. Another object is to provide a rigid cargo cover having features heretofore unavailable.

The invention broadly comprises a pair of lightweight lockable panels, each comprised of a thin metal outer sheet joined to a thin inner metal sheet. The panels are interconnected by a linear hinge which extends along the full width of the panels and are attached to a pick-up truck with a pair of caliper hinges. The caliper hinges are attached to a truck's cargo box with clamps whereby the cover can be readily aligned with the cargo box when it is installed.

One feature of the invention is that the cover can be installed with several readily available hand tools. Another feature is that the cover's outward appearance can match the appearance of a pick-up truck. Another feature is that the cover can be used with a variety of pick-up trucks.

In a first aspect of the invention, the front and rear panels are locked to a pick-up truck cargo box with a pair of mechanically operated key locks. In a second aspect, the front and rear panels are locked to the cargo box with a pair of solenoid operated locks. In a third aspect of the invention, the front and rear panels are locked to the cargo box with a single lock.

In employing the teaching of the present invention, a plurality of alternate constructions can be adopted to achieve the desired results and capabilities. In this disclosure, only several embodiments are discussed. However, these embodiments are intended as examples and should not be considered as limiting the scope of the invention.

Further features and benefits will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

FIG. 1 is a plan view of a cargo cover according to the invention in a closed condition and partially open condition on a pick-up truck.

FIG. 2 is a left side view of the closed cargo cover and pick-up truck.

FIG. 3 shows the cover in a partially opened condition.

FIG. 4 is an enlarged end view of the cargo cover in a condition for storage.

FIG. 5 is a plan view of the cargo cover mounted on an extended wheelbase pick-up truck.

FIG. 15 is an enlarged cross-sectional view taken on the line 15—15 in FIG. 13.

FIG. 16 is an enlarged fragmentary view of FIG. 13.

FIG. 17 is an enlarged cross-sectional view taken on the line 17—17 in FIG. 16.

FIG. 18 is an enlarged cross-sectional view taken on the line 18—18 in FIG. 16.

FIG. 19 is an enlarged cross-sectional view taken on the line 19—19 in FIG. 16.

FIG. 20 is an enlarged cross-sectional view taken on the line 20—20 in FIG. 13.

FIG. 21 is a cross-sectional view taken on the line 21—21 in FIG. 20.

FIG. 22 is an enlarged cross-sectional view taken on the line 22—22 in FIG. 6 showing a safety catch mounted on an open cover.

FIG. 23 is a bottom view of the safety catch of FIG. 22.

FIG. 24 is an enlarged cross-sectional view taken on the line 20—20 in FIG. 6 showing the safety catch when the cargo cover is closed.

FIG. 25 is an enlarged cross-sectional view taken on the line 20—20 in FIG. 6 showing the safety catch when the cargo cover is partially open.

FIG. 29 is a plan view of an alternate embodiment.

FIG. 30 is an enlarged cross-sectional view taken on the line 30—30 in FIG. 29.

FIG. 31 is an enlarged fragmentary view taken in the circle "A" in FIG. 29.

FIG. 37 is an enlarged partial view of FIG. 36.

FIG. 38 is a bottom view of the alternate embodiment of FIG. 35.

FIG. 39 is an enlarged cross-sectional view taken on the line 39—39 in FIG. 38.

DETAILED DESCRIPTION OF THE PREFERRED EMBODIMENT

Figure 6:
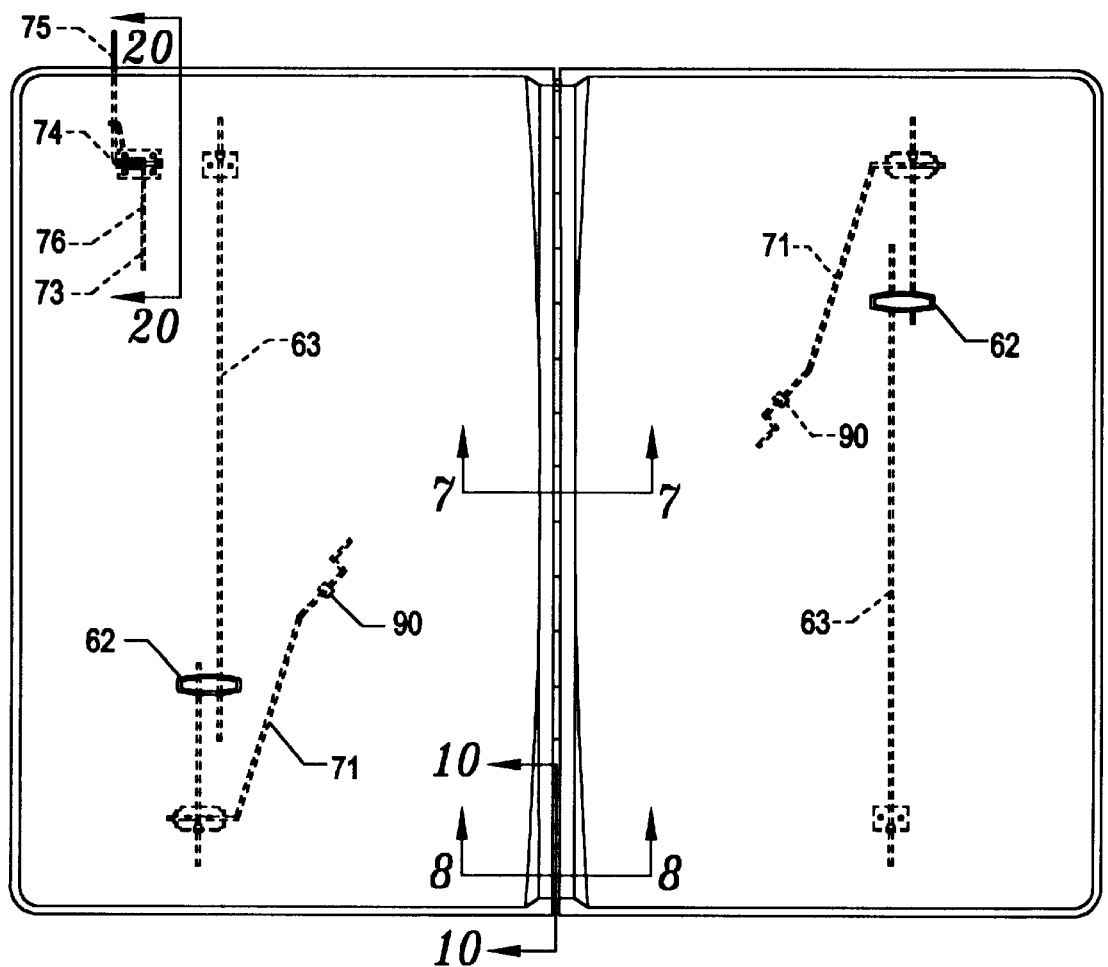
FIG. 6 is an enlarged plan view of the cargo cover.
Figure 8:
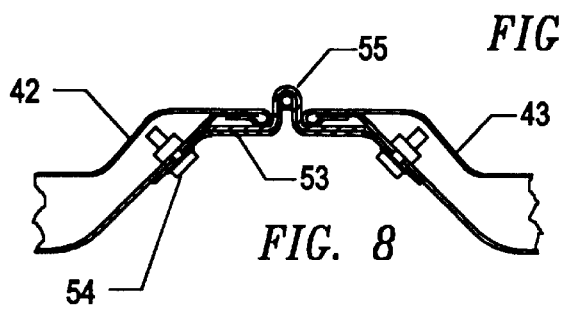
FIG. 8 is an enlarged cross-sectional view taken on the line 8—8 in FIG. 6.
Figure 7:
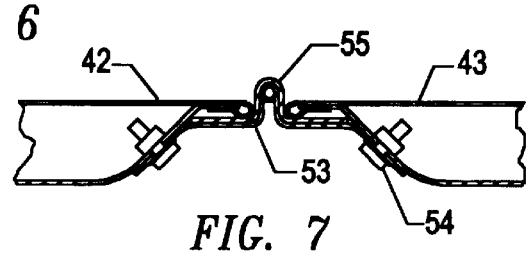
FIG. 7 is an enlarged cross-sectional view taken on the line 7—7 in FIG. 6.

Referring now to the drawings wherein like numerals designate like and corresponding parts throughout the several views, in FIGS. 1 through 3, inclusive, a cargo cover 40 is mounted in covering and uncovering relationship on a cargo box 41 of a typical pick-up truck 46. The cargo cover 40 is comprised of a pair of similar lightweight front 42 and rear 43 panels, mounted for rotation about a transverse axis of the pick-up truck 46. Each of the panels 42, 43 is rotatable 180 degrees from a fully closed horizontal position wherein the panels 42, 43 are oppositely aligned (FIG. 2) with the cargo box 41 of the truck 46 to a fully open horizontal position wherein one of the panels 42 is in adjacent relationship to the—other panel 43 (FIG. 3).

One benefit of the invention is that the weight of the cover 40 is low. The low weight is achieved by using thin metal sheets with a plurality of depressions 44 in the sheets for rigidity. The low cover weight improves vehicle fuel economy and allows the cover 40 to be removed by a single person. Another benefit is that the cover 40 can be removed without tools and stored in the compact shape of FIG. 4. Another benefit is that the cover 40 can be quickly installed with readily available tools. Another benefit is that the cover 40 can be used on a variety of pick-up trucks. In FIG. 5 the cover 40 is shown in combination with a fixed filler panel 45 on an extended wheelbase pick-up truck 47.

Referring to FIGS. 6–9, 13 and 14, the front 42 and rear 43 panels consist of stamped thin outer metal sheets 48 joined with a hem flange 50 along their outer edges to stamped thin inner metal sheets 49. A rubber seal 51 adjacent to the hem flange 50 prevents water from entering the cargo box 41. The rubber seal 51 extends around the sides and ends of the front 42 and rear 43 panels.

Figures 13, 14:
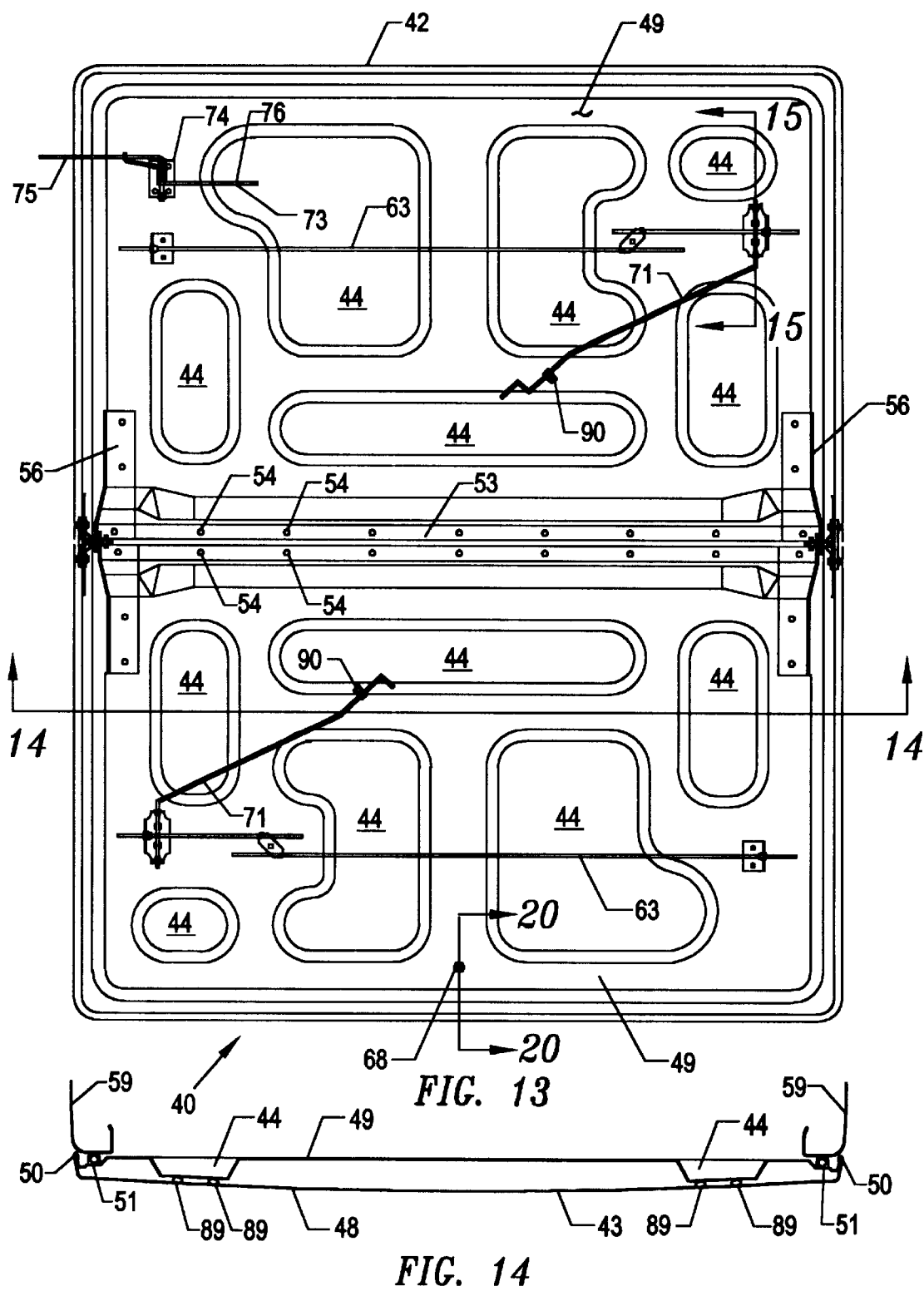
FIG. 13 is an enlarged bottom view of the cargo cover.
FIG. 14 is a cross-sectional view taken on the line 14—14 in FIG. 13.
Figure 35:
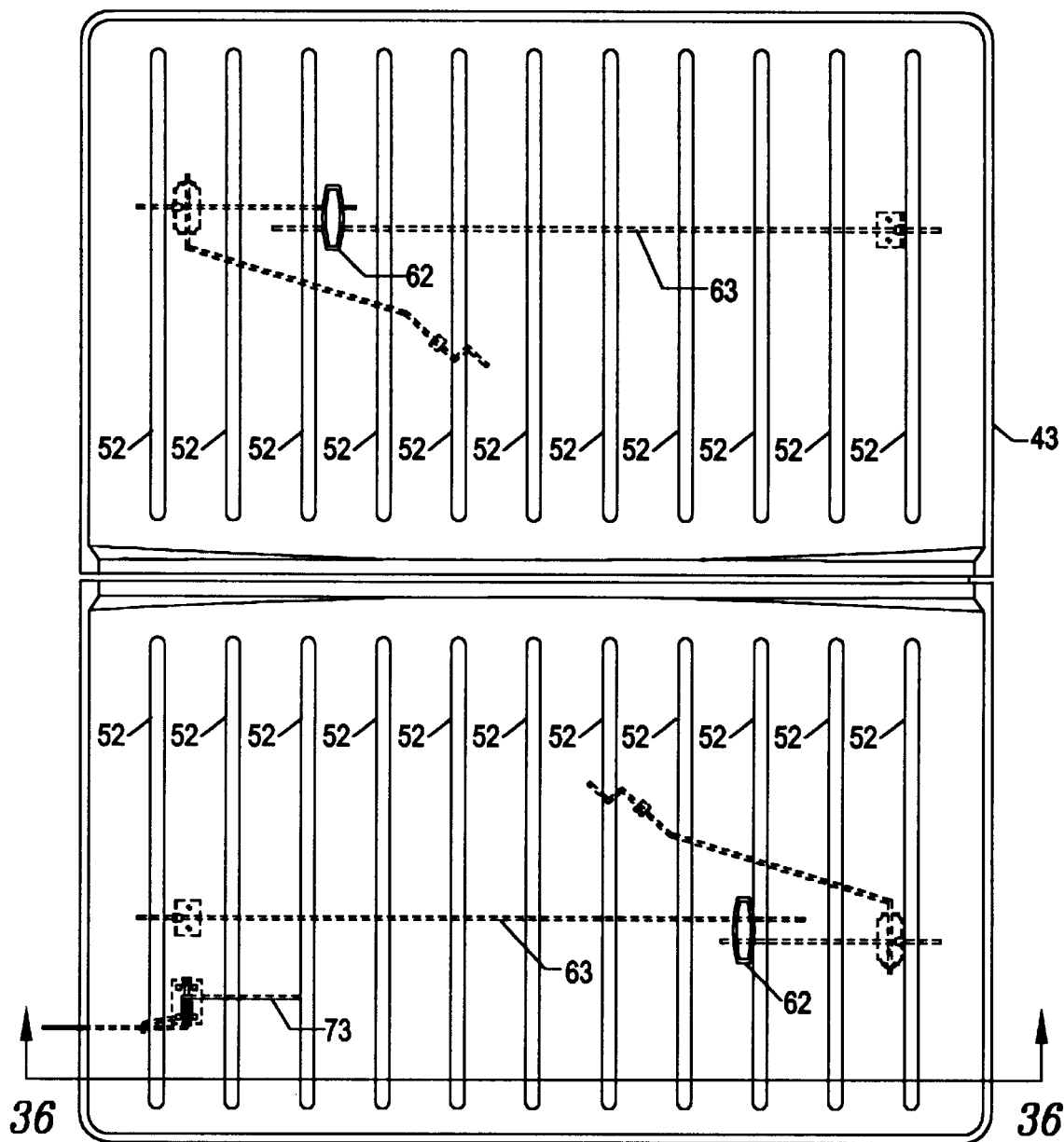
FIG. 35 is a plan view of another alternate embodiment.
Figure 36:
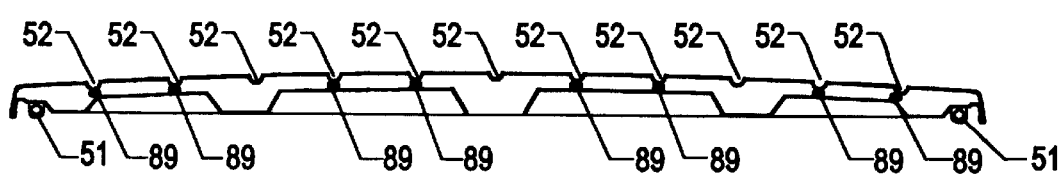
FIG. 36 is a cross-sectional view taken on the line 36—36 in FIG. 35.

The hem flange 50 is formed by folding and crimping the outer edge portions of the outer sheets 48 around the outer edges of the inner sheets 49. The hem flange 50 increases the rigidity and reduces the cost of the cover 40. Although the hem flange 50 is preferred, the outer sheets 48 can be joined to the inner sheets 49 as shown in FIGS. 37 and 39 by joining the outer edge portions with adhesives or by resistance welding. Rigidity can be further increased by connecting interior portions of the outer and inner panels with an adhesive 89, as shown in FIG. 14. The adhesive also prevents the panels 42, 43 from vibrating which produces objectionable noise. Cover rigidity may be still further increased by providing depressions 52 in the outer panel 42 as shown in FIGS. 35 and 36.

The outer 48 and inner 49 sheets are preferably aluminum or low carbon high strength steel. The exterior surfaces of the panels 42, 43 are painted or powder coated in colors which complement or match the colors of the pick-up truck 46. The cover 40 may also be installed on the pick-up truck 46 and painted by a manufacturer during the painting of the pick-up truck 46. When the same finish is applied to the cover 40 as the pick-up truck 46, the cover 40 appears to be an integral part of the pick-up truck 46.

Referring now to FIGS. 6 through 9, the front panel 42 is pivotally connected to the rear panel 43 by a linear hinge 53 which extends across the full width of the panels 42, 43. The linear hinge 53, which is a feature of the invention, is attached to the front 42 and rear 43 panels with threaded fasteners 54. The surfaces of the front 42 and rear 43 panels, adjacent to the hinge 53, extending linearly across the front 42 and rear 43 panels, are a styling feature of the cover 40. A thin rubber seal 55 covers the hinge 53 to prevent water from entering the cargo box 41.

Figure 9:
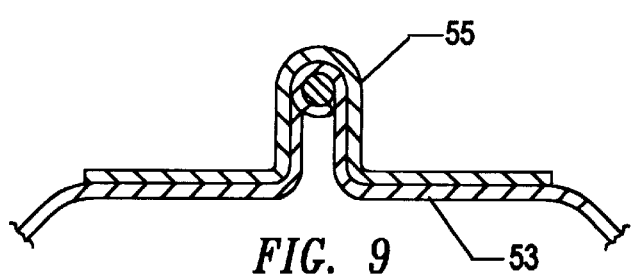
FIG. 9 is an enlarged fragmentary view of FIG. 7.
Figure 12:
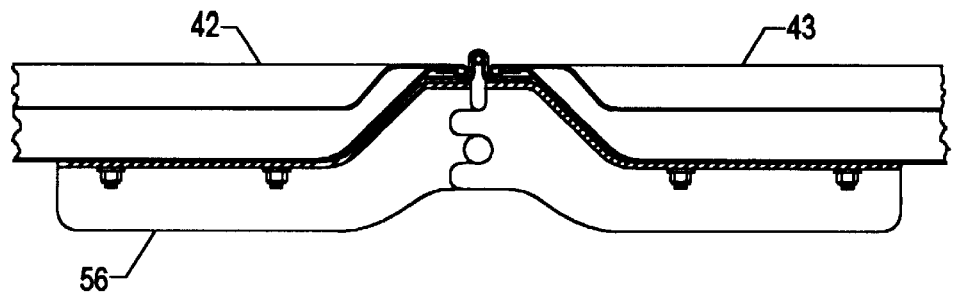
FIG. 12 is an enlarged cross-sectional view taken on the line 12—12 in FIG. 10.
Figure 11:
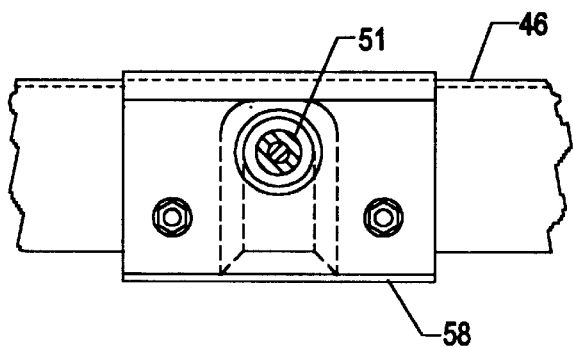
FIG. 11 is an enlarged cross-sectional view taken on the line 11—11 in FIG. 10.
Figure 12A:
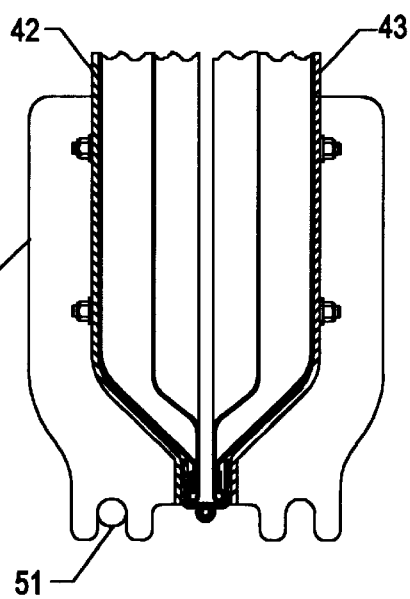
FIG. 12A is an enlarged fragmentary view of the cover during its installation or removal.
Figure 10:
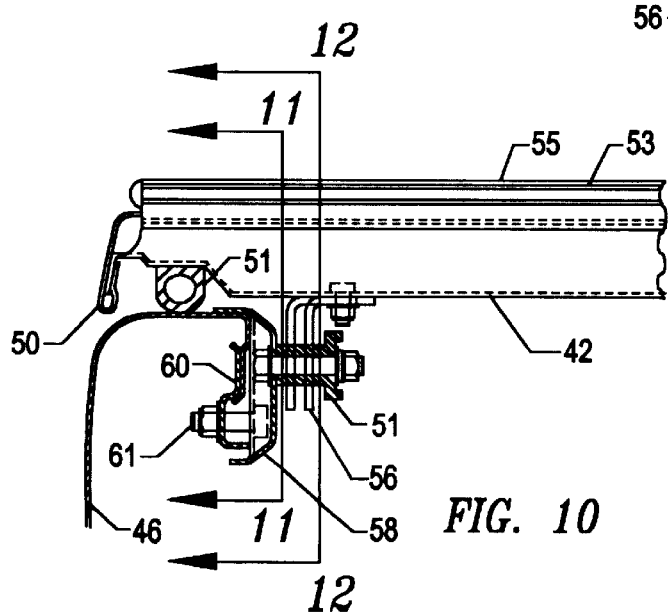
FIG. 10 is an enlarged cross-sectional view taken on the line 10—10 in FIG. 6.

With reference to FIGS. 9 though 12, the cover 40 is attached to the pick-up truck 46 with a pair of caliper hinges 56. The caliper hinges 56 rotate about pivot shafts 57 which extend inwardly from brackets 58 which are attached to inner surfaces of rails 59 which form the sides of the cargo box 41. As shown in FIG. 6, the brackets 58 are fastened to the rails 59 with clamp brackets 60 and threaded fasteners 61. The clamp brackets 60 allow the pivot shaft brackets to be moved in a fore-and-aft direction to align the cover 40 with the pick-up truck 46. The orientations of the caliper hinges 56 when the cover 40 is closed are shown in FIG. 12. The cover 40 is removed by opening the front 42 and rear 43 panels, as shown in FIG. 12A, to disengage the caliper hinges 56 with the pivot shafts 57.

A means for locking the front 42 and rear 43 panels to the pick-up truck 47 is illustrated in FIGS. 13 through 19, inclusive. Each of the panels 42, 43 is locked with a key lock 62, a pair of thin transverse locking rods 63 mounted on the panels 42, 43, and a pair of strikers 64 mounted on opposite cargo box rails 59. The key lock 62 has a T-handle 66 which rotates a link 65 which moves the locking rods 63 in opposite directions outwardly to locked positions and inwardly to unlocked positions. When a panel 42 or 43 is locked, the outer end portions of the locking rods 63 extend under the strikers 64, preventing the panel 42 or 43 from being opened.

In FIGS. 20 and 21, a means for locking the vehicle's tailgate 67 to the rear panel 43 is shown. When the tailgate 67 is locked, a downward extending latch pin 68 which is attached to the rear panel 43 engages an aperture 69 of a striker 70 which is attached to the tailgate 67.

With reference to FIGS. 2, 13, 15, and 19, pivotally attached to each of the panels 42, 43 is a thin cylindrical prop rod 71 for supporting the panels 42, 43 in partially open positions. When the prop rods 71 are not in use they are stored adjacent to the panels 42, 43 by engaging the free ends of the prop rods with clips 90 which are attached to the panels 42, 43. When the rods 71 are in use, the free ends of the rods 71 engage apertures 72 in the lock rod strikers 64.

Referring to FIGS. 22 through 25, when the front panel 42 is left unlocked and the pick-up truck is moving, a safety latch 71 limits the opening of the front panel 42. The safety latch 71 is comprised of a bracket 74 attached to the front panel 42, a thin wire arm 75 pivotally mounted in the bracket 74 and a torsion spring 76 which resiliently biases the wire arm 75 toward the front panel 42. When the front panel 42 is raised and the safety latch 71 is disengaged, the wire arm 75 rests against the front panel 42 as shown in FIG. 22.

The wire arm 75 must be rotated to close the front panel 42, and rests against a side of the truck 47 when the panel is closed as shown in FIG. 24. When the front panel 42 is unlocked and the pick-up truck 47 is in motion, a hook shaped end portion 77 of the arm 75 limits the opening of the front panel 42, as shown in FIG. 25.

Figure 26:
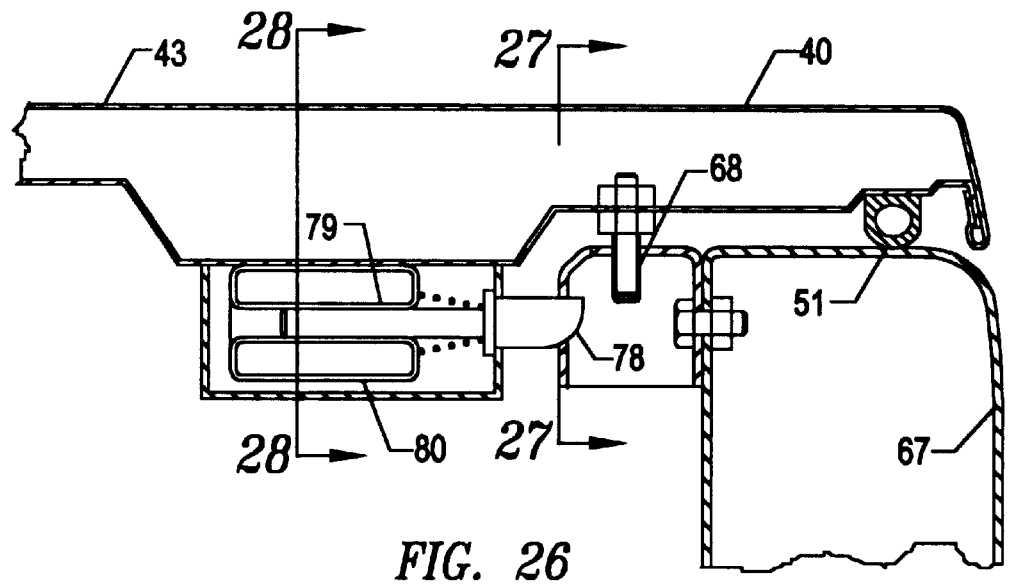
FIG. 26 is an enlarged cross-sectional view through an alternate embodiment wherein a solenoid is used for locking the cover to a pick-up truck.
Figure 27:
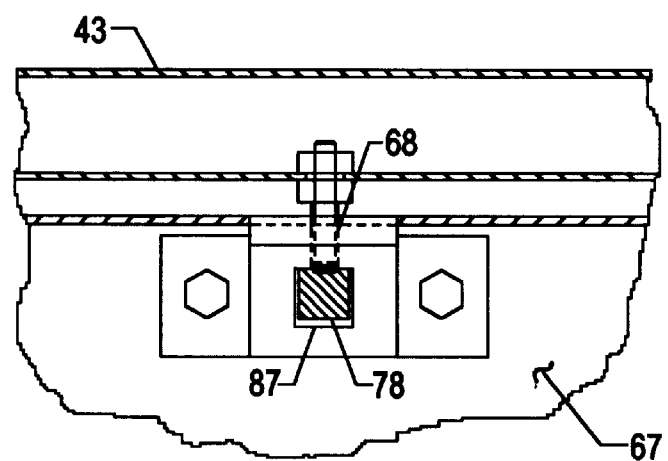
FIG. 27 is a cross-sectional view taken on the line 27—27 in FIG. 26.
Figure 28:
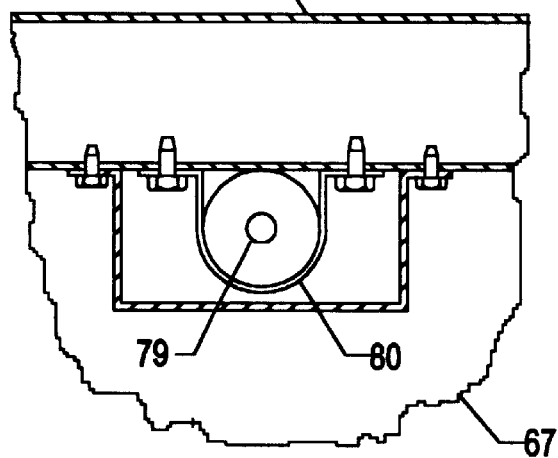
FIG. 28 is a cross-sectional view taken on the line 28—28 in FIG. 26.
Figure 34:
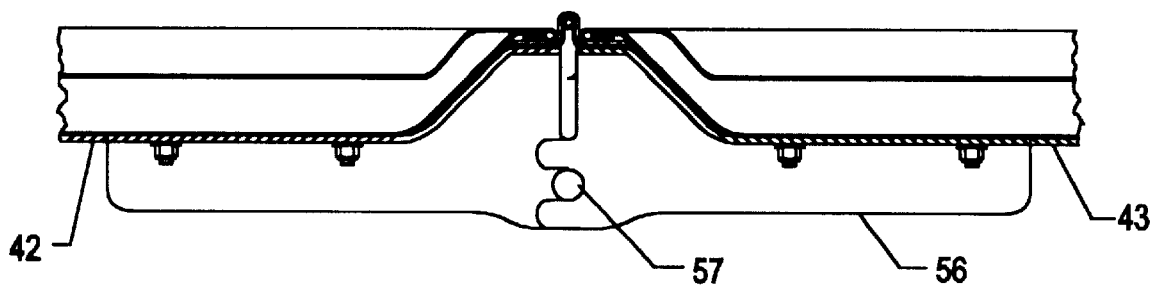
FIG. 34 is a cross-sectional view taken on the line 34—34 in FIG. 32.

In FIGS. 26 through 28, an alternate means is shown for locking the rear cover 43 to the pick-up truck 47. When the rear cover 43 is locked, a latch 78 attached to an end of a plunger 79 of a "pull" type solenoid 80 engages an aperture 81 of a striker 82 which is attached to the tailgate 67 of the pick-up truck 47. A latch pin 68 which is attached to the rear panel 43 engages a second aperture 83 of the striker 82, thereby locking the rear panel 43 to the tailgate 67. When the solenoid 80 is energized by a usual type control, the latch 78 is withdrawn from the striker 82, thereby unlocking the rear panel 43.

In FIGS. 29 through 34, a means is depicted for locking a front 42 and rear 43 panel with a single key lock 62. Referring to FIGS. 29 through 31, an "L" shaped striker 84 is attached to the passenger cab 85 of the pick-up truck 47. The striker 84 extends rearwardly above a forward portion of the front panel 42, thereby preventing an opening of the front panel 42. A centering pin 86 a which is attached to the front panel 42 extends upwardly from the front panel 42 and engages a slot 87 of the striker 84 and prevents a lateral movement of the front panel 42. The rear panel 43 is locked to the pick-up truck 47 by the key lock 62, the pair of transverse locking rods 63 and the pair of strikers 64 in the manner previously described.

Figure 33:
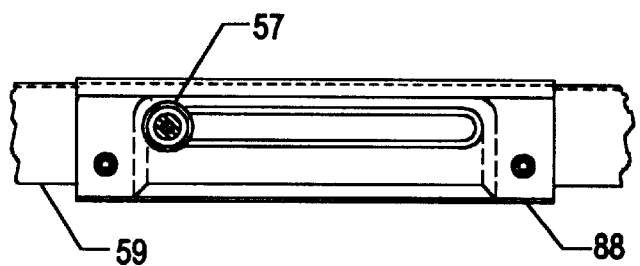
FIG. 33 is a cross-sectional view taken on the line 33—33 in FIG. 32.
Figure 32:
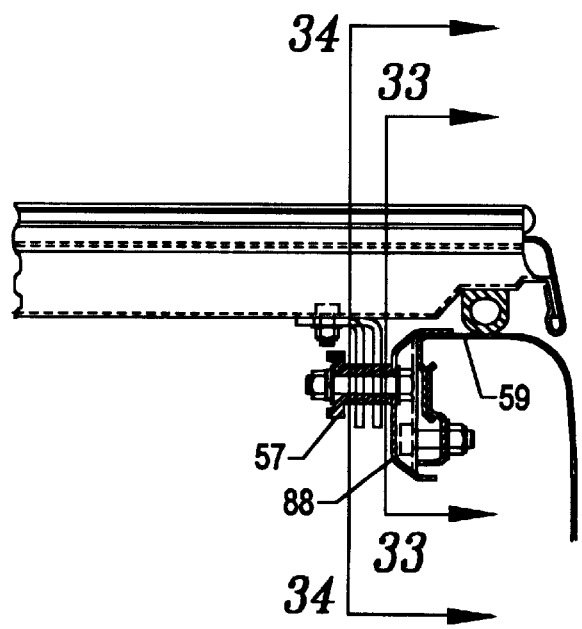
FIG. 32 is an enlarged cross-sectional view taken on the line 32—32 in FIG. 30.

Referring now to FIG. 33, the caliper hinges 56 engage pivot shafts 57 which are slidably mounted in brackets 88 which are clamped to the cargo box rails 59, thereby allowing a limited fore- and aft movement of the cargo cover 40. With reference to FIG. 30, the front panel 42 is unlocked by raising the rear panel 43 and sliding the cover 40 rearwardly in the direction of arrow "B" by an amount which is sufficient to disengage the front panel 42 from the striker 84 which is attached to the passenger cab 85.

From the foregoing, it will be understood that my invention provides a lightweight rigid cargo cover having novel features which is easily installed and removed from a pick-up truck.

Although only several embodiments have been illustrated and described, it is not my intention to limit my invention to these embodiments since other embodiments can be derived by such changes as substitutions of parts, changes in materials, and changes in the numbers and arrangements of parts without departing from the spirit thereof.

I claim:

1. In combination with a pick-up truck having an open cargo box extending from a forward portion adjacent to a passenger cab of said pick-up truck to a rear portion adjacent to a tailgate of said pick-up truck and side portions bounded by sides of said pick-up truck, a cargo cover for covering said open cargo box, said cover comprising: a front panel for covering said forward portion of said cargo box, said front panel comprised of a first pair of thin spaced apart co-extensive stamped metal sheets joined together along outer front and opposite side portions of said front panel; a rear panel for covering said rear portion of said cargo box, said rear panel pivotally connected to said front panel and comprised of a second pair of thin spaced apart coextensive metal sheets joined together along outer rear and opposite side portions of said rear panel; a means for pivotally connecting said front panel to said rear panel; and a means for pivotally connecting said front panel and said rear panel to said sides of said pick-up truck, said pick-up truck connecting means comprising a pair of pivot pins attached to said opposite sides of said pick-up truck cargo box and a pair of hinges on said opposite side portions of said cover for detachably mounting said cover on said cargo box, each of said pairs of hinges having a pair of opposing members, said pair of opposing members having open end slotted portions engaging one of said pivot pins, said open end slotted portions being in non-releasable relationship with said pivot pins when said panels of said cover are closed and in releasable relationship with said pivot pins when said panels of said cover are open.

2. The combination set forth in claim 1 wherein said front and rear panels are identical panels.

3. The combination set forth in claim 1 further comprising a means for locking said front and said rear panels to said pick-up truck.

4. The combination set forth in claim 3 wherein said means for locking said front panel and said rear panel to said pick-up truck cargo box comprises: a pair of thin transverse spaced apart rods slideably mounted on an underside portion of each of said panels; a short link having one end portion attached to one of said rods and an opposite end portion connected to the other of said rods; a means for moving the rods of each pair of rods outwardly in opposite directions to locking positions and inwardly to unlocking positions; and a pair of strikers mounted on opposite sides of said pick-up truck, said strikers being in overlying relationship to end portions of said rods when rods are in said locking positions.

5. The combination set forth in claim 4 wherein said means for moving said rods of each pair of said rods outwardly to locking positions and inwardly to unlocking positions comprises a link pivotally attached to each of said panels, said link having opposite end portions attached to each pair of rods; and a means for rotating said link.

6. The combination set forth in claim 5 wherein said means for rotating each of said links is a key lock.

7. The combination set forth in claim 3 wherein said means for locking said front panel to said pick-up truck comprises a striker attached to said passenger cab, said striker having a rearward extending portion which is in overlying relationship to a forward portion of said front panel when said front panel is locked to said pick-up truck; and a means for sliding said front cover rearwardly to unlocking relationship with said striker to unlock said cover from said pick-up truck.

8. The combination set forth in claim 3 further comprising a means for locking said tailgate to said rear panel.

9. The combination set forth in claim 8 wherein said means for locking said tailgate to said rear panel comprises: a downward extending locking pin attached to said rear panel; and a striker attached to said tailgate, said striker having a rearward extending portion, said rearward extending portion having an aperture for receiving said pin.

10. The combination set forth in claim 1 wherein at least one of said thin metal sheets of each of said panels has a plurality of depressions for increasing the rigidity of said panels.

11. The combination set forth in claim 10 wherein said thin metal sheets are adhesively joined together at a plurality of locations within said sheets.

12. The combination set forth in claim 1 wherein said metal sheets of each of said panels are joined together along said outer portions of said metal sheets by hem flanges, said hem flanges of each of said metal sheets being formed by folding an outer portion of one of said metal sheets over an outer portion of the other of said metal sheets.

13. The combination set forth in claim 1 wherein said metal sheets of each of said panels are joined together along said outer front and opposite side portions and said outer rear and opposite side portions by welding.

14. The combination set forth in claim 1 wherein said thin metal sheets are thin aluminum sheets.

15. The combination set forth in claim 1 wherein said thin metal sheets are thin steel sheets.

16. The combination set forth in claim 1 further comprising a means for supporting at least one of said panels in a partially open position, said means comprising a thin cylindrical rod pivotally attached to an underside portion of said panel, said rod being movable from a non-operative position adjacent to said underside of said panel to an outward operative position which is non-adjacent to said panel; and a clip attached to said underside of said panel for retaining said rod in said non-operative position.

17. The combination set forth in claim 1 further comprising a safety latch for automatically restraining said front panel in a partially open position when said front panel is unlocked and said pick-up truck is in motion, said safety latch comprising: a thin cylindrical rod pivotally attached to an underside portion of said panel, said thin cylindrical rod being resiliently biased upwardly toward said underside of said front panel and having an end portion for engaging a side of said cargo box to restrain said panel in said partially open position on said cargo box; and a means for resiliently biasing said rod upwardly toward said underside of said front panel.

18. The combination set forth in claim 1 wherein said panels are pivotally connected with a linear hinge, said linear hinge substantially extending across the full width of said cover.

19. The combination set forth in claim 18 further comprising a thin rubber seal, said seal being in covering relationship to said hinge.

20. The improvement set forth in claim 1 wherein caliper hinges are clamped to said sides of said pick-up truck cargo box for aligning said cover with said pick-up truck cargo box.

21. In combination with a pick-up truck, a cargo cover for covering an open cargo box of said pick-up truck comprising: a pair of similar pivotally connected panels extending from a forward portion of said cargo box to a rearward portion of said cargo box, each of said panels being comprised of a pair of thin co-extensive stamped metal sheets joined together along opposite outer side portions of said sheets by folding opposite outer side portions of one of said sheets over opposite outer side portions of the other of said sheets; a linear hinge for pivotally connecting said panels, said hinge substantially extending across the full width of said cover; a means pivotally connecting said cover to said pick-up truck; a means for locking said panels to said pick-up truck; a means for supporting at least one of said panels in a partially open position.

22. In combination with a pick-up truck, a cargo cover for covering an open cargo box of said pick-up truck comprising: a pair of pivotally connected panels extending from a forward portion of said cargo box to a rearward portion of said cargo box, each of said panels being comprised of a pair of thin co-extensive stamped metal sheets joined together along three outer portions of said pair of sheets by folding outer portions of one of said sheets over outer portions of the other of said sheets.

* * * * *